April 23, 1963  J. W. KELSO  3,086,783
EXPANDING MANDREL FOR MACHINING PIPE ENDS
Filed Aug. 17, 1960  2 Sheets-Sheet 1
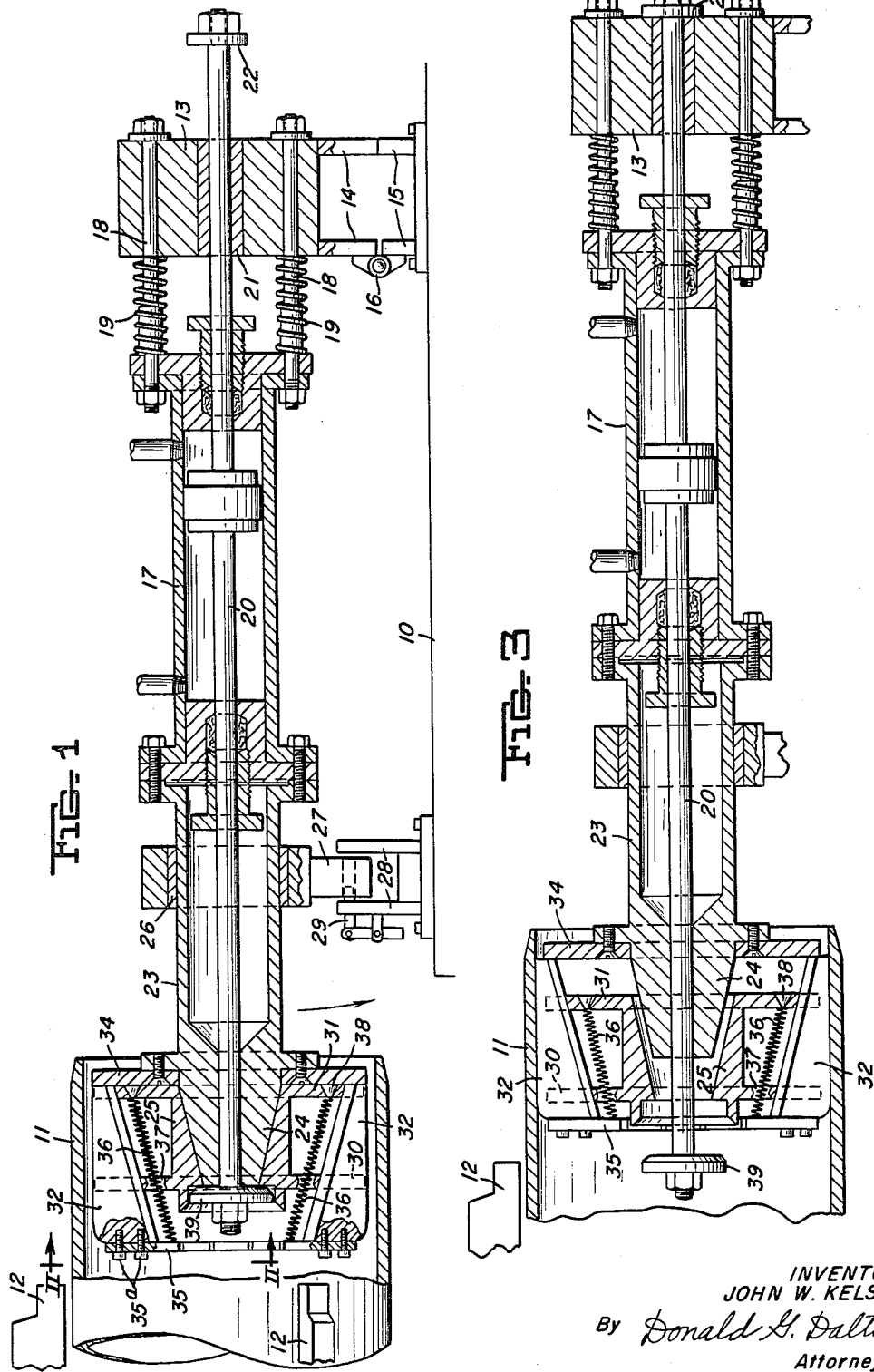
INVENTOR
JOHN W. KELSO
By Donald G. Dalton
Attorney

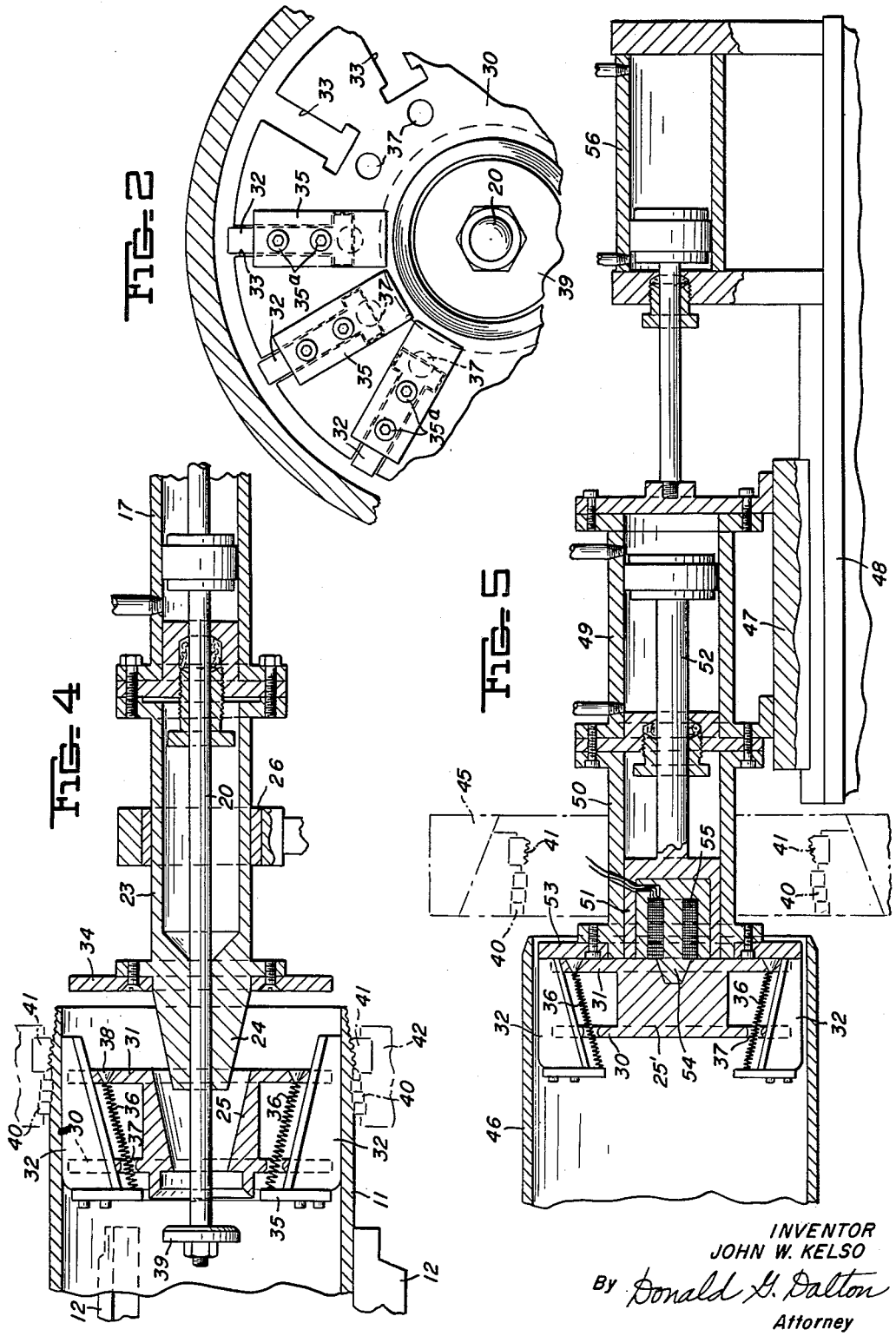

United States Patent Office 3,086,783
Patented Apr. 23, 1963

3,086,783
EXPANDING MANDREL FOR MACHINING PIPE ENDS
John Wallace Kelso, Dravosburg, Pa., assignor to United States Steel Corporation, a corporation of New Jersey
Filed Aug. 17, 1960, Ser. No. 50,234
9 Claims. (Cl. 279—2)

This invention relates to apparatus for turning and threading pipe ends and, in particular, to a mandrel adapted to enter the pipe end and support it against externally applied forces.

Pipe-threading machines are of two types. In one, the tools are stationary and the pipe is rotated; in the other the pipe is held stationary and the tools are rotated. In either case, the pipe length is engaged by a chuck, preferably near one end to avoid whip. The pipe section is usually not perfectly circular but is elastically deformed to such condition by the chuck. When threaded and released by the chuck, the section returns to normal shape which means that the thread does not meet the gage size and taper requirements at all points.

I have invented a mandrel for use with pipe-threading machines, which expands when inserted in the end of a pipe length, to the extent permitted by engagement with the pipe wall, and resists radial forces tending to change the shape thereof. Thus, by the use of my mandrel a completed thread will be circular after removal of the pipe length from the chuck, even though the end of the pipe departs slightly from a true circle, and will conform to the gage size and taper required.

In a preferred embodiment, my improved mandrel comprises a hub with a flange or disc at each end, the flanges having slots for T-section wedges spaced circumferentially thereof. Spring means normally cause the wedges to expand. The hub is engageable by a thruster coaxial therewith and a pusher plate on the thruster is adapted to engage the wedges to cause contraction thereof. A pull rod extends through the thruster and a fluid-pressure cylinder is provided for operating the pull rod and thruster.

A complete understanding of the invention may be obtained from the following detailed description and explanation which refer to the accompanying drawings illustrating the present preferred embodiment. In the drawings:

FIGURE 1 is a central longitudinal vertical section through the preferred form of the apparatus of my invention;

FIGURE 2 is a partial elevation of one of the hub flanges showing a pipe length in section;

FIGURES 3 and 4 are partial sections similar to FIGURE 1 showing alternate positions of the parts; and FIGURE 5 is a view similar to FIGURE 1 showing a modified form of the mandrel of my invention, with parts omitted for clarity, applied to a threading-machine in which the pipe is held stationary and the tools are driven, the mandrel being separable from its operating mechanism.

Referring now in detail to the drawings and, for the present, to FIGURES 1 and 2 particularly, the apparatus there shown is mounted on the frame 10 of a pipe-threading machine for cooperation with the end of a pipe length 11 gripped by driving chuck jaws 12. A tail block 13 has spaced depending webs 14 resting on upstanding webs 15, the left hand webs being hinged at 16. A horizontal fluid-pressure cylinder 17 is yieldably mounted on block 13 by means of through bolts 18 and compression springs 19. The bolts are enlarged intermediate their ends affording integral shoulders for a purpose which will appear later. The piston rod 20 of cylinder 17 extends through both ends thereof and is slidable in a bushing 21 seated in block 13. A collar 22 at the right-hand end of the rod limits leftward movement thereof by engagement with block 13.

A mandrel-mounting sleeve or thruster 23 extends from the left-hand end of cylinder 17 and has a tapered nose 24 adapted to enter a correspondingly shaped bore in mandrel hub 25. A bearing 26 supports the sleeve. The bearing is in turn supported on a post 27 which is received between upstanding webs 28. A retractable pin 29 holds the post in elevated position. Withdrawal of the pin permits the post to drop whereupon cylinder 17 and sleeve 23 pivot about hinge 16 for a purpose which will appear later.

Hub 25 has flanges 30 and 31 at opposite ends thereof. Wedges 32 of T-section are slidable in slots 33 (see FIGURE 2) formed in the flanges at an angle of 13° to 15° (for unlubricated steel) to the axis of the hub and spaced circumferentially thereof. A pusher plate 34 on sleeve 23 is adapted to engage the rear ends of the wedges to advance them in the slots and thereby contract them. Each wedge has a length of bar 35 secured by screws 35a, extending radially inward from the forward end thereof. Tension springs 36 are secured to the inner ends of bars 35. These springs are inserted through holes 37 in flange 30 and are attached to conical anchor plugs 38 seated in similarly shaped holes in flange 31.

Piston rod 20 extends forwardly from cylinder 17 through nose 24 and has a collar 39 thereon adapted to engage the forward (left-hand) end of hub 25. When the parts are in the positions shown in FIGURE 1, with fluid pressure applied to the left-hand end of cylinder 17, collar 39 pulls hub 25 to the right so that pusher plate 34 causes all wedges to move leftward in the hub and are thereby held in contracted position. Springs 19 cause sleeve 23 to be held in its extreme forward position. Pipe length 11 is then advanced from the left to the position shown and gripped in chuck jaws 12.

When the pipe length has been thus moved in for tapering and threading of the end thereof, fluid is exhausted from the left end of cylinder 17 and introduced into the right end. FIGURE 3 shows the initial result of the consequent leftward movement of rod 20. Collar 39 moves away from hub 25 and springs 36 pull the hub leftward moving the wedges outwardly until they engage the interior of the pipe wall. Leftward movement of rod 20 is arrested by engagement of collar 22 with block 13. When such engagement has been effected, continued application of fluid under pressure to the right hand end of cylinder 17 causes the cylinder itself to move to the right, compressing springs 19, to the extent permitted by the shoulders on bolts 18. This produces the condition shown in FIGURE 4, i.e., leaving the mandrel hub and wedges entirely free for rotation with the pipe as the end thereof is engaged first by taper-turning tools 40 and then by thread chasers 41.

On completion of the turning and threading operation, release of the pressure in the right-hand end of cylinder 17 permits springs 19 to restore the cylinder and sleeve 23 to the position of FIGURE 3. Thereafter the application of fluid pressure to the left end of cylinder 17 causes retraction of rod 20 whereupon collar 39 engages hub 25, moves it to the right and thereby contracts wedges 32. All parts are thus restored to the position shown in FIGURE 1, so the pipe may be removed from the threading machine.

Tools 40 and 41 are mounted in holders 42 on a saddle or carriage (not shown) adapted to move on frame 10. When it is necessary to change tools, pin 29 is pulled out to permit cylinder 17 and sleeve 23 to tilt downwardly as explained. This drops the mandrel hub and associated parts down out of the way so as to afford access to the tools.

The apparatus of my invention as described above may also be used with pipe-threading machines in which the pipe is held stationary and the tools rotate, if sufficient clearance exists between the tool-carrying head when retracted, and the end of the pipe. In such case the cylinder 17 and sleeve 23 are disposed coaxially in the quill which drives the tool-carrying head. If sufficient clearance does not exist, the modification of FIGURE 5 may be used in which the mandrel is physically separable from its mounting.

The apparatus of FIGURE 5 cooperates with a conventional threading machine including a driven-tool-carrying head or ring 45 for engagement with pipe length 46 gripped in a chuck and thus held stationary. A slide 47 movable in ways formed in a supporting base 48 mounts a fluid-pressure cylinder 49. A sleeve 50 extends forwardly from one end of the cylinder and has a cup-shaped plunger or thruster 51 slidable therein, carried on the end of the piston rod 52 of cylinder 49. Sleeve 50 has a pusher plate 53 thereon (corresponding to plate 34 of FIGURE 1) and for actuating the wedges 32 of a mandrel assembly including hub 25', flanges 30 and 31 and springs 36. This assembly is the same as that of FIGURE 1 except that hub 25' fits on a frusto-conical nose 54 extending forwardly from the core of an electro-magnet 55 seated in plunger 51. A fluid-pressure cylinder 56 mounted on base 58 has its piston rod connected to cylinder 49 for moving the latter toward and from the end of the pipe length.

In operation, slide 47 is retracted by cylinder 56 while the pipe length is being positioned in the fixed chuck for tapering and threading and head 45 is likewise retracted. When the pipe has been clamped, cylinder 49 with its piston retracted, is advanced to insert the contracted mandrel assembly in the pipe end. Thereafter cylinder 49 is operated to advance its piston rod. This moves plunger 51 and hub 25' forward and permits springs 36 to expand the wedges 32 into engagement with the interior of the pipe wall. Electro-magnet 55 is then deenergized and the pistons of both cylinders 49 and 50 are retracted, leaving the mandrel assembly in the pipe. Head 45 is then driven and advanced toward the pipe to effect the desired machining. When this is completed, the piston rod 52 is again advanced with magnet 55 energized to contract the mandrel after which retraction of the piston rod withdraws it from the end of the pipe length. Duplicate units may be provided, if desired, for inserting the mandrel in a pipe length before it is placed in the threading machine and for withdrawing the mandrel after the length has been removed from the machine.

It will be evident that the structure and operation of the apparatus of FIGURE 5 are essentially the same as those of the apparatus of FIGURE 1. The difference is that magnet 55 is substituted for the collar 39 to pull the hub toward the thruster.

The advantage of the mandrel of my invention is that it insures that the thread formed on the end of a pipe length will be truly circular when the pipe chuck is released and accurate as to gage size and taper, despite any slight deviation from circular shape of the pipe end which may have existed originally. The improved mandrel also materially reduces the vibration incident to high-speed turning operation, whether the tools rotate or the pipe itself. The mandrel is expanded or contracted by light axial forces but when expanded, resists radial forces effectively. This is because the angle of the wedges 32 is so small that friction between the wedges and the slots in flanges 30 and 31 prevents axial movement thereof under radial pressure.

Although I have disclosed herein the preferred embodiment of my invention, I intend to cover as well any change or modification therein which may be made without departing from the spirit and scope of the invention.

I claim:

1. An expanding mandrel comprising a hub, axially spaced flanges thereon, the peripheries of the flanges having T-shaped slots spaced circumferentially thereof, the slots in one flange being radially deeper than those in the other, T-section wedges having inner edges at an acute angle to the axis of the hub, slidable in said slots, spring means connected to said wedges and one of said flanges tending to effect axial movement of the wedges in such direction that they also move radially outward, said hub having a tapered bore therein, a thruster having a tapered nose adapted to seat in said bore and a pusher plate on said thruster adapted to engage the ends of said wedges and move them axially against the force of said spring means, said angle being such that friction between said inner edges and said slots prevents displacement of the wedges by radial pressure thereon.

2. Apparatus as defined in claim 1, characterized by means carried by said thruster adapted to pull said hub toward said thruster.

3. Apparatus as defined in claim 2, characterized by said pulling means being a tension rod extending from the thruster through said hub.

4. Apparatus as defined in claim 2, characterized by said hub being removable from said thruster and said pulling means being an electro-magnet positioned on said thruster to attract said hub.

5. Apparatus as defined in claim 1, characterized by a fluid-pressure cylinder alined with said thruster, said thruster including a sleeve extending coaxially from one end of said cylinder, said plate being carried by said sleeve, a piston rod in said cylinder extending through said sleeve to actuate said hub.

6. Apparatus as defined in claim 5, characterized by spring back-up means for said cylinder and means arresting forward movement of the piston rod therein whereby said cylinder moves rearwardly when said arresting means has become effective.

7. Apparatus as defined in claim 6, characterized by a hingedly mounted block carrying said spring back-up means.

8. Apparatus as defined in claim 1, characterized by a front bearing supporting said thruster for rotation.

9. An expanding mandrel comprising a thruster having a conical nose at one end thereof and a pusher plate mounted on said thruster inwardly from the end of said nose, a hub coaxial with said thruster having a tapered bore adapted to fit on said nose, said hub having flanges spaced axially therealong, the peripheries of said flanges having radial T-shaped slots spaced circumferentially thereof, the slots in the flange more remote from said plate being deeper than the slots in the other flange, T-section wedges having their inner edges at an acute angle to the axis of said hub slidable in said slots, spring means urging said wedges axially in such direction along the hub that they also move radially outward, and means for pulling said hub toward said nose whereby the ends of said wedges engage said plate, said angle being such that friction between said wedges and said slots prevents axial displacement of the wedges by radial pressure thereon.

References Cited in the file of this patent

UNITED STATES PATENTS

| | | |
|---|---|---|
| 1,615,978 | Greer | Feb. 1, 1927 |
| 1,650,375 | Milliken | Nov. 22, 1927 |
| 1,651,598 | Higgins | Dec. 6, 1927 |
| 1,869,780 | Rosener | Aug. 2, 1932 |
| 2,544,633 | Le Count | Mar. 6, 1951 |
| 2,850,287 | Jackson | Sept. 2, 1958 |